Figure 1:
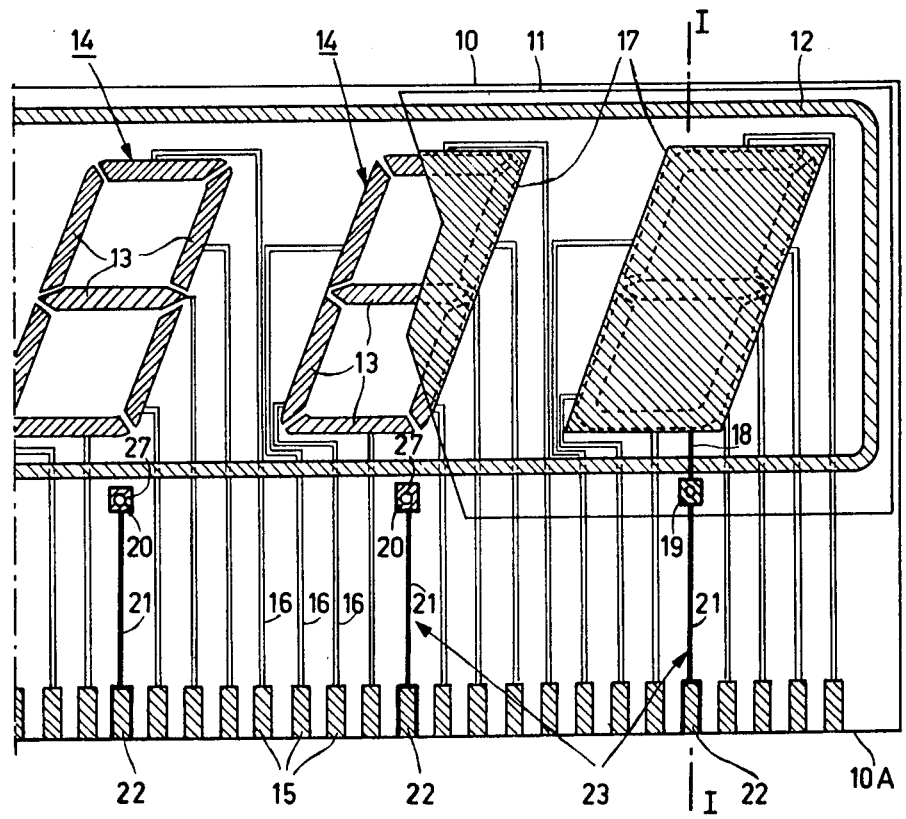

United States Patent
Bescond

[11] 4,013,344
[45] Mar. 22, 1977

[54] DISPLAY DEVICE
[75] Inventor: Francois Joseph Marie Bescond, Dueil, France
[73] Assignee: U.S. Philips Corporation, New York, N.Y.
[22] Filed: June 9, 1975
[21] Appl. No.: 585,388
[30] Foreign Application Priority Data
   June 24, 1974    France .................. 74.21835
[52] U.S. Cl. .................. 350/160 LC; 339/61 M; 339/17 M
[51] Int. Cl.² .................. G02F 1/13; H01R 13/24
[58] Field of Search .......... 350/160 LC; 339/17 M, 339/278 C, 61 M; 58/50 R

[56] References Cited
UNITED STATES PATENTS

| | | | |
|---|---|---|---|
| 3,680,037 | 7/1972 | Nellis et al. | 339/278 C X |
| 3,829,601 | 8/1974 | Jeannotte et al. | 339/278 C X |
| 3,861,135 | 1/1975 | Seeger, Jr. et al. | 58/50 R |
| 3,881,809 | 5/1975 | Fergson et al. | 350/160 LC |

FOREIGN PATENTS OR APPLICATIONS

| | | | |
|---|---|---|---|
| 2,058,104 | 5/1972 | Germany | 350/160 LC |
| 1,919,567 | 11/1970 | Germany | 339/17 M |

*Primary Examiner*—John K. Corbin
*Assistant Examiner*—Rolf Hille
*Attorney, Agent, or Firm*—Frank R. Trifari; Carl P. Steinhauser

[57] ABSTRACT

A display device, for example, with a liquid crystal, in which all the output terminals are grouped along the edge of one of the supporting plates of the device. The electric connections between an electrode provided on one of the supporting plates and the output terminals provided on the oppositely located supporting plate consists of contact elements in the form of pills which are formed from a kneadable conductive material.

4 Claims, 2 Drawing Figures

DISPLAY DEVICE

The invention relates to a display device comprising two parallel supporting plates arranged at a short distance from each other, in which the surface of each supporting plate at the side facing the other supporting plate has at least one electrode and the supporting plates are kept spaced apart by a spacing member determining a closed circumference, in which the volume bounded by the said supporting plates and the said spacing member is filled with a display medium and the said electrodes also extend on parts of the supporting plates outside the said volume and in which only one of the plates comprises connection strips for the electric connection of the device.

It is known that in such display devices, for example those using liquid crystals, all the output terminals which are destined for the connections of display devices to the external apparatus are arranged along the edge of only one of the supporting plates having electrodes.

In this manner it is possible to connect all the electrodes by means of only one connection plug. However, in that case it is necessary to provide connections between on the one hand the connection strips which are all present on one of the supporting plates and on the other hand the electrodes which are present on the other supporting plate, so at a different level.

Such connections are usually of silver and are obtained by means of layers of colloidal paste which are arranged manually in the desired places between the supporting plates. The silver contacts obtained in this manner do not give full satisfaction due to the fact that on the one hand the said contacts are not stable and on the other hand that it is difficult to provide the said connections in a correct manner; it is to be noted in particular that the lacquer used tries to penetrate between the supporting plates by capillary forces, which may cause shortcircuit between the electrodes.

In German Pat. application No. 2,058,104 a type of intermediate contact is described which reduces the possibility of shortcircuits between the electrodes. According to the said application, the contacts are formed by pieces of wire of tungsten or of gold which are for example slid between the two supporting plates of the display device. The said pieces of wire also determine the correct distance between the supporting plates.

The diameter of the wire used for that purpose should be small since the distance between the supporting plates is generally only from 10 $\mu$m to 50 $\mu$m; as a result of this the possibility of shortcircuits which may occur between adjacent electrodes and which are due, for example, to a movement of the wire upon assembling the elements of the display device is small. On the other hand, the quality of the contact obtained by means of a wire is not constant; in particular, said contact is not linear while the ohmic resistance thereof is only very poorly defined. Actually, said supporting plates will inevitably show defects as regards smoothness, while the mechanical contact surface between the electrodes and the wire cannot show the desired small width throughout the length of a piece of wire. In the case in which several intermediate contacts are realized by means of pieces of wire in the same display device, the quality of said contacts is inevitably very doubtful as a result of the fact that the said supporting plates have a more or less undulated surface or are distorted to a certain extent. In addition, the assembly of the elements of the display device is not easy in that case because the said pieces of wire which are simply provided on one of the supporting plates can experience a certain movement upon providing the second supporting plate.

The invention mitigates the drawbacks occurring upon realizing readily defined and stable contacts with a small ohmic resistance between conductive surfaces which bear on the facing supporting plates of display devices with liquid crystal.

Actually, the invention uses the possibility of obtaining certain conductive bodies in the form of small calibrated balls.

According to the invention, a display device of the kind mentioned in the first paragraph is characterized in that the electric connection between a connection strip and a corresponding electrode which is provided on the oppositely located supporting plate consists of a contact element in the form of a pill which is formed from a kneadable conductive material.

The expression "contact in the form of a pill" is to be understood to mean herein a contact element whose surface area (measured in the direction parallel to the surface of the supporting plate of the display device) is smaller in all directions than the surface area of the conductive surfaces with which the said contact is in contact so that the said contact cannot extend further than the said surface.

The use of contacts in the form of a pill of a kneadable material instead of rigid contacts (formed by a metal layer or by pieces of conducting wire) presents several advantages.

In the first instance the kneadability of the material used ensures the good quality of the contact to the conductive surfaces of the supporting plates. When actually the said contact elements are subjected to a certain pressure they can deform to a greater or smaller extent and adapt in this manner to all unevennesses of the supporting plates. Due to the possibility of their deformation, the said contacts compensate for the defects of smoothness of the supporting plates and they form rigid and stable mechanical connections to said plates.

On the other hand the contacts have substantially the same geometry and comprise on the supporting plates contact areas which can be correctly calculated. Furthermore it is very readily possible to calculate the ohmic resistance of said contacts as well as the current density in said contacts.

On the other hand it is possible due to the small dimensions of the contact elements to avoid all possibility of shortcircuit between the adjacent conductive surfaces of the same supporting plate.

Another advantage of the kneadability of the material used for manufacturing the contacts is that it is possible, in order to obtain different distances between the supporting plates of the display device, to use small conductive masses which initially have the same dimensions.

The mechanical and electrical quality of the resulting contact is good in all cases, on the condition that the said small masses do not experience too large a deformation. On the other hand it is to be noted that, in the case of rigid contacts, as is the case in the said German patent application, contacts which were previously calibrated to a given thickness should be used for every determined distance value between the supporting plates.

Conductive materials showing the mechanical and electrical qualities suitable for the manufacture of contact elements in display devices according to the invention are: indium, lead and certain alloys of two or more metals selected from the group indium, lead, tin, bismuth, antimony and gallium.

Indium, for example, has the advantage of adhering naturally to glass and also to the metal oxide layers constituting the electrodes of the display devices. This facilitates the assembly of the elements of the display device: the small indium balls are laid on one of the supporting plates in the place where the contacts are to be formed and adhere immediately to the place assigned to them, which in assembling the elements of the display device means a guarantee against the risk of a shortcircuit by a movement of one or several contacts.

It is to be noted that some of the abovementioned qualities of indium were already used before, which is stated in the German Pat. specification No. 1,917,674. Said patent specification describes that a plug of indium is used to realize a conductive tight passage through the glass wall of an electron tube. It is to be noted, however, that such a method does not utilize the kneadability of the indium so as to obtain in this manner a contact between two components which are arranged at a not very well-defined distance from each other and in which said distance decreases during the manufacturing process as is the case in assembling the elements of a display device according to the invention: the said kneadability of the indium is used in the said patent specification only to close an aperture.

Figure 2:
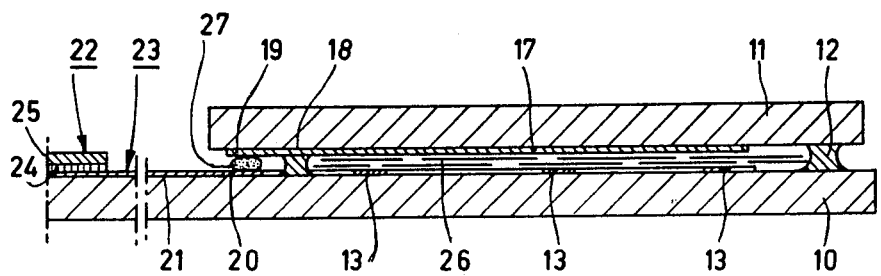

The invention will be described in greater detail with reference to the drawing, in which FIG. 1 is a front elevation of a device with liquid crystal according to the invention in which a supporting plate of the device is shown partly, FIG. 2 is a sectional view on an enlarged scale taken on the line I-I of FIG. 1.

The device with liquid crystal shown in FIGS. 1 and 2 comprises two transparent insulating supporting plates 10 and 11, for example of glass; the plate 10 is present opposite to plate 11 and said plates are kept spaced apart by a spacing member 12.

Each of the plates 10 and 11 supports a number of transparent electrodes which consist of thin indium oxide layers or thin layers which are formed by a mixture of indium oxide and tin oxide.

The electrodes 13 arranged on the supporting plate 10 constitute, for example, groups 14 each comprising seven electrodes with which the digits 0 through 9 can be displayed in known manner. Each electrode 13 is connected to an output terminal 15 via a conductor 16. All the output terminals 15 are arranged along the edge 10a of the supporting plate 10. Therefore, the surface of the said supporting plate 10 the edge 10a of which may be provided with a connection plug for the electric supply of the display device should be larger than the surface of the supporting plate 11.

Opposite to each group of electrodes 14 of the supporting plate 10 the supporting plate 11 supports an opposite electrode 17 in the form of a parallellogram.

Each opposite electrode 17 comprises a conductor 18 which is connected to a conductive zone 19 on the edge of the supporting plate 11. Opposite to the said zone 19 an identical zone 20 is provided on the supporting plate 10 and is connected to an output terminal 22 via a conductor 21. The above-mentioned "connection strip" is formed by the assembly 23 which is formed on the supporting plate 10 by a conductive zone 20, a conductor 21 and an output terminal 22.

In FIG. 1 the conductors 21 and the relevant terminals 22 are shown in solid lines so as to distinguish from the conductors 16 and the other terminals 15, but actually the structure of all said parts is of course the same.

The conductors 16, 18 and 21, the conductive zones 19 and 20, the output terminals 15 and 22 are obtained as an electrode 13 and as an opposite electrode 17 by providing thin transparent layers of indium oxide or similar layers of an alloy of indium oxide and tin oxide. In addition the output terminals 15 and 22 are reinforced by on the one hand the metal layers 24, for example of nickel, and on the other hand the metal layers 25, for example of gold.

Furthermore, the volume bounded by the supporting plates 10, 11 and the spacing member 12 is filled with a liquid crystal.

According to the invention, each of the electric contacts between on the one hand the connection strips 23 which are provided on the plate 10 and on the other hand the opposite electrodes 17 which are provided on the oppositely located supporting plate 11 are formed by a contact element 27 which is formed by a conductive kneadable material. More precisely, in the embodiment shown in the drawings the contacts are provided between the conductive zones 20 of the connection strips 23 and the conductive zones 19 which are connected to the opposite electrodes 17 via the conductors 18.

The contact element in the form of a pill should be sufficiently small so as to achieve that the area thereof is smaller in all directions than the area of the conductive zones 19 and 20 to which the said contacts 27 are connected. As a result of this the possibility of shortcircuit via contacts 27 between a zone 19 or 20 and the adjacent conductors 16 is avoided.

On the other hand, the result of the fact that the contacts 27 are formed by a kneadable material is that the shape of the said contacts is sensitive to the pressure exerted on the supporting plates 10 and 11 during the assembly of the elements of the display device; the said contacts are pleated under the influence of the said pressure but cannot be removed from the supporting plates by a possible sliding movement, which would be the case indeed if balls or stiff wires are used.

It is advantageous if the contacts 27 are manufactured from indium. Before assembling the elements of the device, the future contacts have the form of balls having a diameter in the order of 70 $\mu$m. Said indium balls are provided in the assigned place on the conductive zones 20 of the supporting plate 10. As soon as they have been provided, the indium adheres to the indium oxide or to the mixture of indium oxide and tin oxide and the said balls cannot roll away from the chosen places. After providing the spacing member 12 (formed either by a polyethylene wire the diameter of which is approximately 50 $\mu$m or by a layer of polyethylene the thickness of which is approximately 30 $\mu$m) in the desired place, and after placing the supporting plate 11 in the correct position above the supporting plate 10, the elements of the device are assembled in known manner namely by exerting a certain pressure on the supporting plate 11 while the supporting plate 10 bears on a flat surface and by the simultaneous increase of the temperature to 140° C. Under the influence of said temperature and of the said pressure the polyethylene wire or the polyethylene layer of the spacing member 12 is deformed plastically which has for its result that the final distance between the supporting plates 10 and 11 is from 15 μm to 30 μm as the case may be.

It might be possible that during the assembly of the elements of the display device, the indium reaches the liquid stage due to the fact that the temperature exceeds the melting temperature of the indium (155° C). Actually it has been established that the ball of indium after cooling remains compact and maintains a small area. During the liquid phase the indium is deformed but remains connected to the oxide-covered glass walls via the initial contact zones.

The contact elements 27 may also be manufactured, for example, from lead which is also available in the form of small balls. Since the melting temperature (327° C) of lead is considerably higher than the softening temperature of polyethylene, the lead balls experience only the necessary deformation under the influence of the pressure exerted on the supporting plate 11.

It can be established in all cases that after assembling the elements of the display devices the contacts obtained via the contact elements 27 are of a very good electrical quality and are not annoyingly conspicuous.

What is claimed is:

1. A display device comprising two parallel spaced apart supporting plates, at least one electrode on the surface of each supporting plate, spacer means separating said plates and defining therewith a closed circumference, a display medium filling the volume defined by said supporting plates and said spacer member, said electrodes extending on parts of the supporting plates outside the said volume, connection strips on one of the supporting plates for electrical connection to said electrodes, contact means providing an electric connection between a connection strip and a corresponding electrode which is provided on the oppositely located supporting plate, said means comprising a pill having a surface area measured in a direction parallel to the surface of the supporting plate which is smaller in all directions than the surface area of the conductive surfaces with which the surface area of the pill is in contact so that the said contact cannot extend further than said surface, said pill consisting of a kneadable conductive material.

2. A display device as claimed in claim 1, wherein the pill consists of indium.

3. A display device as claimed in claim 1, wherein the pill consists of lead.

4. A display device as claimed in claim 1, wherein the pill consists of an alloy of metals which belong to the group consisting of indium, lead, tin, bismuth, antimony and gallium.

* * * * *